(12) United States Patent
Yi et al.

(10) Patent No.: US 9,582,896 B2
(45) Date of Patent: Feb. 28, 2017

(54) LINE TRACKING WITH AUTOMATIC MODEL INITIALIZATION BY GRAPH MATCHING AND CYCLE DETECTION

(75) Inventors: Sheng Yi, Raleigh, NC (US); Ashwin Swaminathan, San Diego, CA (US); Bolan Jiang, San Diego, CA (US); Seyed Hesameddin Najafi Shoushtari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1052 days.

(21) Appl. No.: 13/416,721

(22) Filed: Mar. 9, 2012

(65) Prior Publication Data
US 2013/0057700 A1    Mar. 7, 2013

Related U.S. Application Data

(60) Provisional application No. 61/530,907, filed on Sep. 2, 2011.

(51) Int. Cl.
*H04N 5/225*    (2006.01)
*G06T 7/20*    (2006.01)

(52) U.S. Cl.
CPC .. *G06T 7/2046* (2013.01); *G06T 2207/10016* (2013.01)

(58) Field of Classification Search
CPC .................. G06T 7/2046; G06T 2207/10016
(Continued)

(56) References Cited

U.S. PATENT DOCUMENTS 4,891,762 A * 1/1990 Chotiros ...................... 701/514
6,173,066 B1    1/2001 Peurach et al.
(Continued)

FOREIGN PATENT DOCUMENTS

| JP | 2001101419 A | 4/2001 |
|---|---|---|
| JP | 2007520280 A | 7/2007 |
| JP | 2011103031 A | 5/2011 |

OTHER PUBLICATIONS

Kato et al. "Marker Tracking and HMD Calibration for a Video-based Augmented Reality Conferencing System". Augmented Reality, 1999 (IWAR '99). Proceedings 2nd IEEE and ACM International Workshop, pp. 1-10.*

(Continued)

*Primary Examiner* — Christopher S Kelley
*Assistant Examiner* — Zhihan Zhou
(74) *Attorney, Agent, or Firm* — Silicon Valley Patent Group LLP (57) ABSTRACT

A vision based tracking system in a mobile platform tracks objects using groups of detected lines. The tracking system detects lines in a captured image of the object to be tracked. Groups of lines are formed from the detected lines. The groups of lines may be formed by computing intersection points of the detected lines and using intersection points to identified connected lines, where the groups of lines are formed using connected lines. A graph of the detected lines may be constructed and intersection points identified. Interesting subgraphs are generated using the connections and the group of lines is formed with the interesting subgraphs. Once the groups of lines are formed, the groups of lines are used to track the object, e.g., by comparing the groups of lines in a current image of the object to groups of lines in a previous image of the object.

24 Claims, 9 Drawing Sheets

(58) Field of Classification Search
USPC .......................................... 348/169; 382/103
See application file for complete search history.

(56) References Cited

U.S. PATENT DOCUMENTS

| | | | |
|---|---|---|---|
| 7,738,705 B2* | 6/2010 | Casadei | 382/181 |
| 2003/0146869 A1* | 8/2003 | Lin et al. | 342/357.14 |
| 2007/0127774 A1* | 6/2007 | Zhang et al. | 382/103 |
| 2008/0107345 A1* | 5/2008 | Melikian | 382/209 |
| 2010/0277572 A1 | 11/2010 | Nakamura et al. | |
| 2011/0170744 A1* | 7/2011 | Malinovskiy et al. | 382/103 |

OTHER PUBLICATIONS

International Search Report and Written Opinion—PCT/US2012/051737—ISA/EPO—Nov. 20, 2012.

Jiang B., et al.,"A robust hybrid tracking system for outdoor augmented reality", Virtual Reality, 2004, Proceedings. IEEE Chicago, IL, USA Mar. 27-31, 2004, Piscataway, NJ, USA, IEEE, US, Mar. 27, 2004 (Mar. 27, 2004), pp. 3-275, XP010769450, DOI: 10.1109/VR.2004.1310049 ISBN: 978-0-7803-8415-6.

Kato H., et al.,"Marker tracking and HMD calibration for a video-based augmented reality conferencing system", Augmented Reality, 1999. (IWAR '99). Proceedings. 2nd IEEE and ACM International Workshop on San Francisco, CA, USA Oct. 20-21, 1999, Los Alamitos, CA, USA,IEEE Comput. Soc, US Oct. 20, 1999 (1999-10-20) , pp. 85-94, XP010358756, DOI: 10.1109/IWAR.1999.803809 ISBN: 978-0-7695-0359-2.

Seo Y., et al.,"Weakly calibrated video-based augmented reality: embedding and rendering through virtual camera", Augmented Reality, 2000. (ISAR 2000), Proceedings. IEEE and ACM International Symposium on Munich, Germany Oct. 5-6, 2000, Piscataway, NJ, USA, IEEE, US, Oct. 5, 2000 (Oct. 5, 2000), pp. 129-136, XP010520322, DOI: 10.1109/ISAR.2000.880936 ISBN: 978-0-7695-0846-7.

Chintakunta, et al., "Divide and Conquer: Localizing Coverage holes in Sensor Networks," 7th Annual IEEE Communications Society Conference on Sensor Mesh and Ad Hoc Communications and Networks (SECON), Jun. 2010, pp. 1-8.

Cross, et al., "Graph Matching with a Dual-Step EM Algorithm," IEEE Transactions on Pattern Analysis and Machine Intelligence (PAMI), Nov. 1998, pp. 1236-1253, vol. 20, No. 11.

Ghrist, et al., "Coverage and Hole-Detection in Sensor Networks via Homology," IEEE 4th International Symposium on Information Processing in Sensor Networks, Apr. 2005, pp. 254-260.

Reitmayr G. et al., "Going out: Robust tracking for outdoor augmented reality", In Proc. ISMAR 2006, pp. 109-118, Santa Barbara, CA, USA, Oct. 22-25, 2006.

* cited by examiner

```
EdgeSeg_ID=0;
Label(edge set) = 1;
While(Label(edge) >0)
{
        Nextpoint = search8neighbor(edge);
        Label(Nextpoint )= -EdgeSeg_ID;
        Label(edge)= -EdgeSeg_ID;
        EdgeSeg(EdgeSeg_ID).pushback(Nextpoint )
        EdgeSeg_ID ++;
}
```

LINE TRACKING WITH AUTOMATIC MODEL INITIALIZATION BY GRAPH MATCHING AND CYCLE DETECTION

CROSS-REFERENCE TO RELATED APPLICATION(S)

This application claims priority under 35 USC 119 to provisional application No. 61/530,907, filed Sep. 2, 2011, entitled "Line Tracking With Automatic Model Initialization by Graph Matching and Cycle Detection," which is assigned to the assignee hereof and which is incorporated herein by reference.

BACKGROUND

Background Field

Embodiments of the subject matter described herein are related generally to position and tracking, and more particularly to vision based tracking.

Relevant Background

Vision based tracking systems are used to estimate the position and orientation (pose) of a camera with respect to a reference image. The reference image is typically based on multiple images (sometimes referred to as frames) of a portion of the real-world environment captured by the camera or other cameras. With the pose of the camera determined, applications such as, but not limited to, augmented reality may be performed. Accurate and robust tracking is particularly important for applications such as augmented reality, as it enables tight registration between the virtual augmentation and the real-world environment.

One type of vision based tracking is based on detecting and tracking lines in the image. Line tracking algorithms are helpful, for example, in cases when the object being tracked has very little texture. Conventional line tracking, however, lacks the robustness that is desired for many augmented reality applications. Thus, improvements in line tracking are desirable.

SUMMARY

A vision based tracking system in a mobile platform tracks objects using groups of detected lines. The tracking system detects lines in a captured image of the object to be tracked. Groups of lines are formed from the detected lines. The groups of lines may be formed by computing intersection points of the detected lines and using intersection points to identify connected lines, where the groups of lines are formed using connected lines. A graph of the detected lines may be constructed and intersection points identified. Interesting subgraphs are generated using the connections and the group of lines is formed with the interesting subgraphs. Once the groups of lines are formed, the groups of lines are used to track the object, e.g., by comparing the groups of lines in a current image of the object to groups of lines in a previous image of the object.

In an embodiment, a method includes capturing an image of an object to be tracked; detecting a plurality of lines in the image of the object; forming a group of lines from the plurality of lines; and using the group of lines to track the object.

In an embodiment, an apparatus includes a camera; and a processor connected to the camera, the processor configured to detect a plurality of lines in an image captured by the camera of an object to be tracked, form a group of lines from the plurality of lines, and use the group of lines to track the object.

In an embodiment, an apparatus includes means for capturing an image of an object to be tracked; means for detecting a plurality of lines in the image of the object; means for forming a group of lines from the plurality of lines; and means for using the group of lines to track the object.

In an embodiment, a non-transitory computer-readable medium including program code stored thereon includes program code to capture an image of an object to be tracked; program code to detect a plurality of lines in the image of the object; program code to form a group of lines from the plurality of lines; and program code to use the group of lines to track the object.

DETAILED DESCRIPTION

Figure 1A:
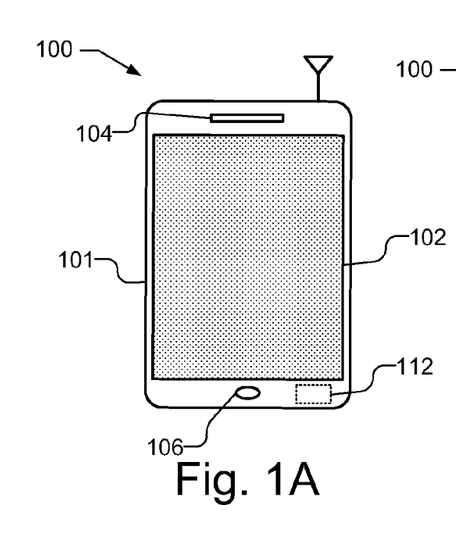
FIGS. 1A and 1B illustrate a front side and back side, respectively, of a mobile platform capable of performing vision based line tracking in a robust manner as described herein.
Figure 1B:
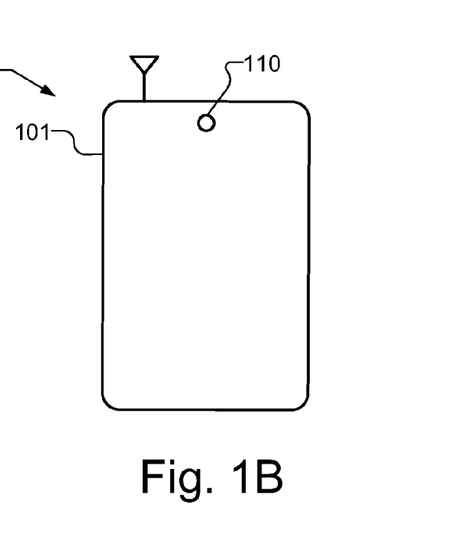

FIGS. 1A and 1B illustrate a front side and back side, respectively, of a mobile platform 100, capable of performing vision based line tracking in a robust manner as described herein. The mobile platform 100 is illustrated as including a housing 101, a display 102, which may be a touch screen display, as well as a speaker 104 and microphone 106. The mobile platform 100 further includes a camera 110 to image the environment for a vision-based tracking unit 112. The vision-based tracking unit 112 tracks groups of lines. One of the shortcomings of most conventional line tracking systems is that lines are tracked independently, which limits the robustness of the process. Tracking groups of lines improves the robustness of the tracking process. In addition, the vision-based tracking unit 112 may use automatic model initialization to obtain the groups of lines to be tracked. The automatic model initialization may be, e.g., graph matching and cycle detection. The vision-based tracking unit 112 may be used with reference free and reference based tracking.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of vision-based tracking.

Figure 2:
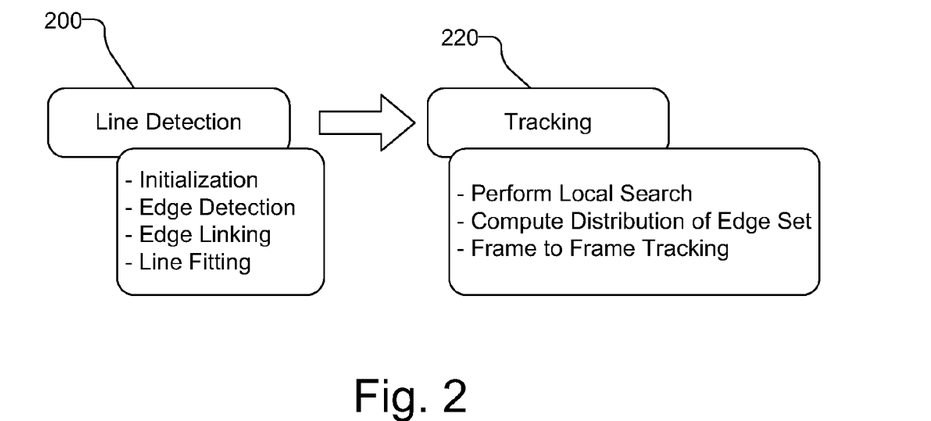
FIG. 2 illustrates two main components of a vision based tracking unit.
Figure 3:
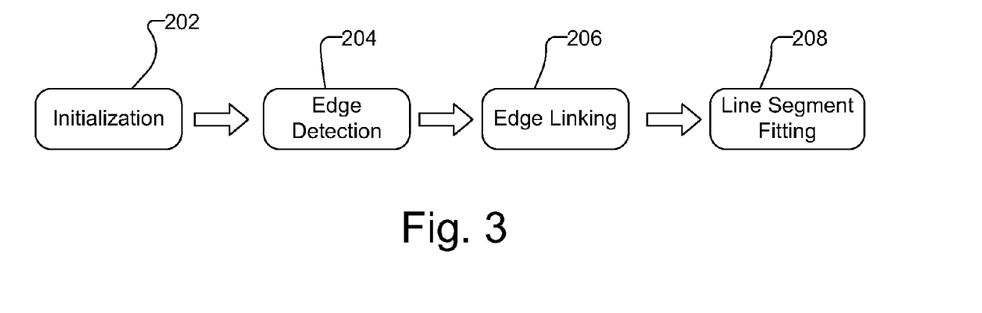
FIG. 3 illustrates components of line detection in the vision based tracking unit.
Figure 4:
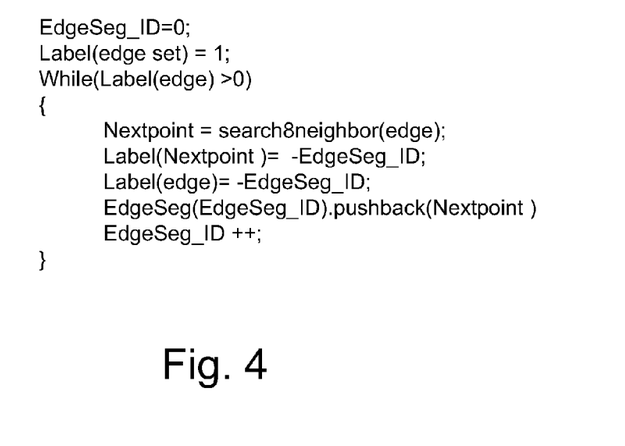
FIG. 4 illustrates an edge linking algorithm.
Figure 5:
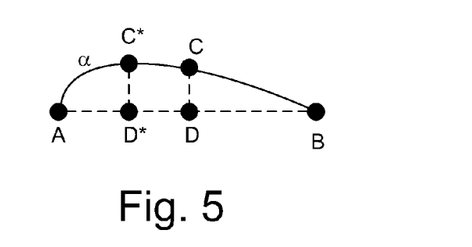
FIG. 5 illustrates line approximation used in line fitting.

As illustrated by FIG. 2, the vision based tracking unit 112 includes two main components: line detection 200 and tracking 220. As illustrated in FIG. 2 and in FIG. 3, line detection 200 includes initialization 202, edge detection 204, edge linking 206 and line segment fitting 208. As illustrated in FIG. 2 and in FIG. 6, tracking 220 includes performing local search, compute distribution of edge set and frame to frame tracking, as illustrated in FIG. 2. Initialization 202 in line detection 200 includes providing an input image of the object to be tracked. Edge detection 204 may be performed by, e.g., a Canny edge detector, Sobel edge detector, Prewitt edge detector, or other appropriate edge detector, which are well known in the art. Edge thinning via non-maximum suppression is then performed to produce a set of edge points in the form of an edge map. Edge linking 206 may then be performed resulting in edge segments. FIG. 4, by way of example, illustrates an edge linking algorithm that may be used. The edge linking algorithm examines each edge point in the edge map and labels the point with an edge-segment ID by examining the edge map in a local neighborhood and identifying other edge points in this region. By way of example, the local neighborhood may be an 8×8 pixel region around an edge point. Line segment fitting 208 is then performed to represent the edge by a plurality of line segments. FIG. 5, by way of example, illustrates line fitting on a curve α between points A to B. For each point C on the curve α between the points A and B, the algorithm first identifies a point D on the line AB such that the line CD is perpendicular to the line AB, or in other words, <AB, CD>=0. The distance CD is noted and the point C that results in maximum distance CD is identified, represented by point C* in FIG. 5. If the maximum distance, i.e., the maximum distance between point C* and corresponding point D*, is less than a suitably pre-chosen threshold, T, then, the line AB is considered a good approximation of the curve α. On the other hand, if the maximum distance is greater than the threshold T, the algorithm is repeated for each of the individual lines AC* and C*B.

Figure 6:
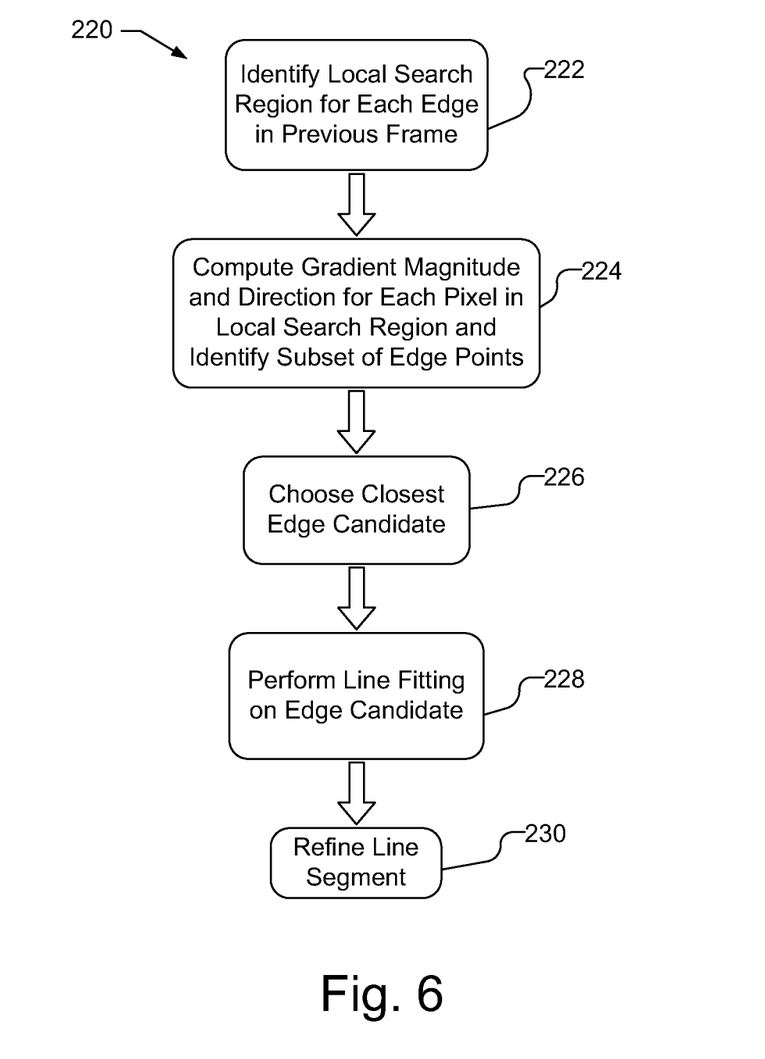
FIG. 6 illustrates line tracking in the vision based tracking unit.
Figure 7A:
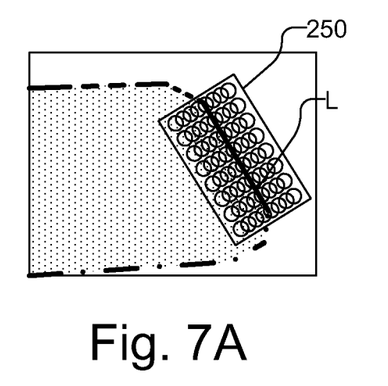
FIGS. 7A, 7B, and 7C illustrate an image that includes a number of edges that is processed for line fitting.
Figure 7B:
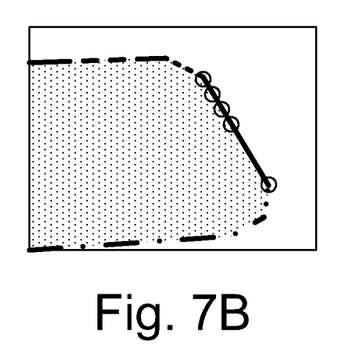
Figure 7C:
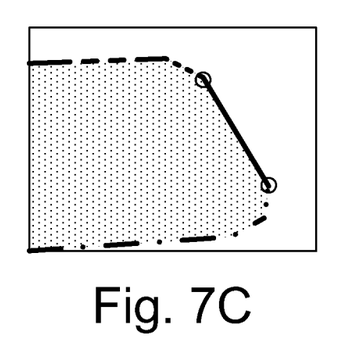

FIG. 6 illustrates line tracking 220 in the vision based tracking unit. For each line segment identified in the line detection 200 phase on the previous frame, a local search region is identified in the current frame (222). FIG. 7A illustrates an image that includes a number of edges with a local search region 250, which may be an 8×8 pixel region, around an edge region L. Next, for each pixel in the local search region, the magnitude and orientation of the gradient is computed based on the current image (224). In one embodiment, a Canny operator may be used to compute image gradients. Alternatively, Sobel or Prewitt kernels, or equivalent gradient computation kernels may be used to compute image gradients. Non maximum suppression may be additionally performed on the gradient map. The distribution of gradient orientations and gradient magnitudes is computed and used to identify a subset of edge points in the search region that have a distribution similar to the line segment L (224). Linear regression techniques may be employed to calculate the dominating direction of the chosen subset of edge points to choose the closest edge candidate (226), as illustrated in FIG. 7B. In one embodiment, Principal Component Analysis (PCA) may be employed to identify the dominating direction of the subset of edge points. The line segment is fit on the subset of edge points in the current frame (228) and its parameters of the line segment are further refined to minimize fitting error (230), as illustrated in FIG. 7C.

Figure 8:
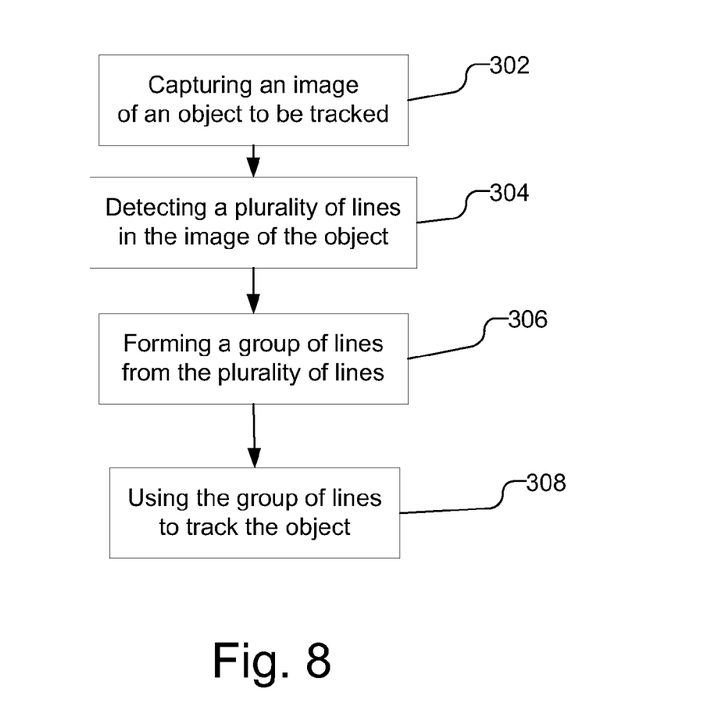
FIG. 8 is a flow illustrating a method of tracking objects using a group of lines.

To increase the robustness of the line tracking system, lines are combined into groups to form a better description, which can then be tracked. FIG. 8 is a flow illustrating a method of tracking objects using a group of lines. As illustrated in FIG. 8, an image of an object to be tracked is captured (302), e.g., as one of a plurality of frames of video or images captured by the mobile platform 100. A plurality of lines in the image of the object are detected (304), e.g., as described above in FIG. 3 or in any other desired manner. A group of lines are formed from the plurality of lines (306) and the group of lines is used to track the object (308) from one frame to the next, e.g., as describe above in FIG. 6 or in any other desired manner. The group of lines may be connected lines, e.g., in a closed figure, such as a square, rectangle, or cycle.

Figure 9:
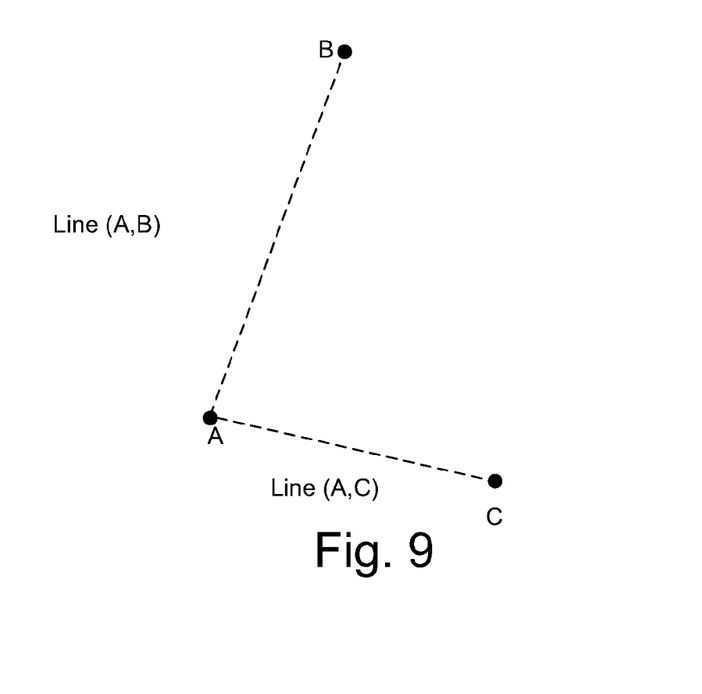
FIG. 9 illustrates lines between three points.

The groups of lines may be formed (306) by computing all intersection points of the plurality of lines and using the intersection points to identify connected lines. For example, the group of lines may be formed by constructing a graph from the plurality of lines; computing all intersection points of the plurality of lines; and generating an interesting subgraph using connections between each pair of intersection points. Once the intersection points are identified, a graph G for the set of lines may be constructed as:

$$G(A, B) = 1, \text{ if } \frac{\|\text{Line}(A, B)\|}{\|A - B\|} > T. \qquad \text{eq. 1}$$

where T is a suitably chosen threshold. FIG. 9, by way of example, illustrates points A, B, and C, with Line (A,B) and Line (A,C). The matrix G for this graph can be written as:

$$G = \begin{bmatrix} 0 & 1 & 1 \\ 1 & 0 & 0 \\ 1 & 0 & 0 \end{bmatrix} \begin{matrix} A \\ B \\ C \end{matrix} \qquad \text{eq. 2}$$

Figure 10:
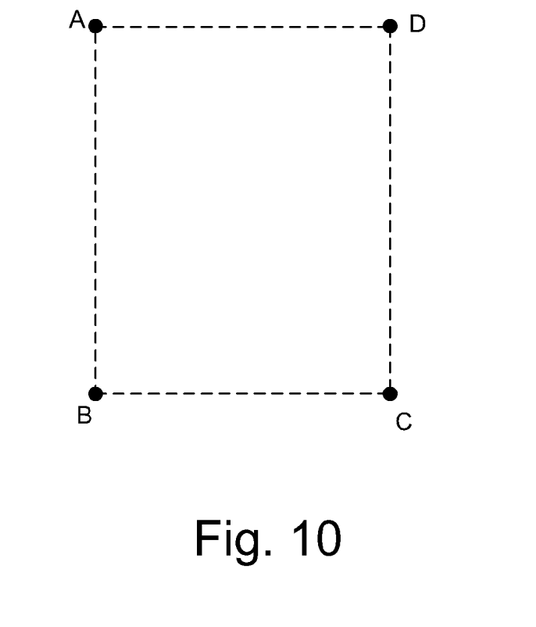
FIG. 10 illustrates lines between vertices A, B, C, and D.

FIG. 10, by way of example, illustrates another possible subgraph having vertices A, B, C, and, which is described by:

$$T = \begin{bmatrix} A & B & C & D \\ 0 & 1 & 0 & 1 \\ 1 & 0 & 1 & 0 \\ 0 & 1 & 0 & 1 \\ 1 & 0 & 1 & 0 \end{bmatrix} \begin{matrix} A \\ B \\ C \\ D \end{matrix} \qquad \text{eq. 3}$$

An interesting subgraph may then be formed using the interesting group of lines. Interesting subgraphs from a tracking perspective may be a triangle, square, rectangle, a general polygon or cycle.

Once the group of lines is formed, e.g., as an interesting subgraph, matching techniques can be used to track the group of lines from frame to frame (308). Matching may be performed with or without a reference.

If prior knowledge of the object to be tracked is available, then this information could be utilized and exact subgraph and object tracking could be performed by matching the current input frame with the known object of interest. By way of example, the type of prior knowledge that could help object tracking could be a reference image of the object to be tracked in the case of 2D tracking, a reference 3D model of the object in the case of 3D tracking, a sequence of frames from different views of the 3D object, or even an edge map of the 2D or 3D model.

In the absence of prior knowledge, tracking is performed by comparing subsequent frames, i.e., by comparing the current frame with a previous frame, which may be either an immediately preceding frame or a frame that precedes the current frame by plurality of frames. With no prior knowledge, cycle detection may be performed, in which the closed path in a graph is considered to be the boundary of the interesting area, as discussed below.

In the matching phase, given a set of detected lines in a current image, all the intersection points are computed. A graph is built by considering the connection between each pair of intersection points. Then model initialization is done to detect interesting subgraphs and exact subgraph graph matching is used to compare the detected subgraph with the subgraph of the model frame (in the case of reference based tracking) and subgraph of the previous frame (in the case of reference free tracking).

Figure 11:
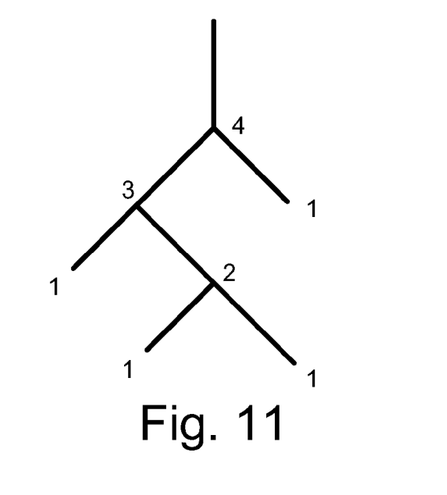
FIG. 11 illustrates cycle detection and splitting.
Figure 12A:
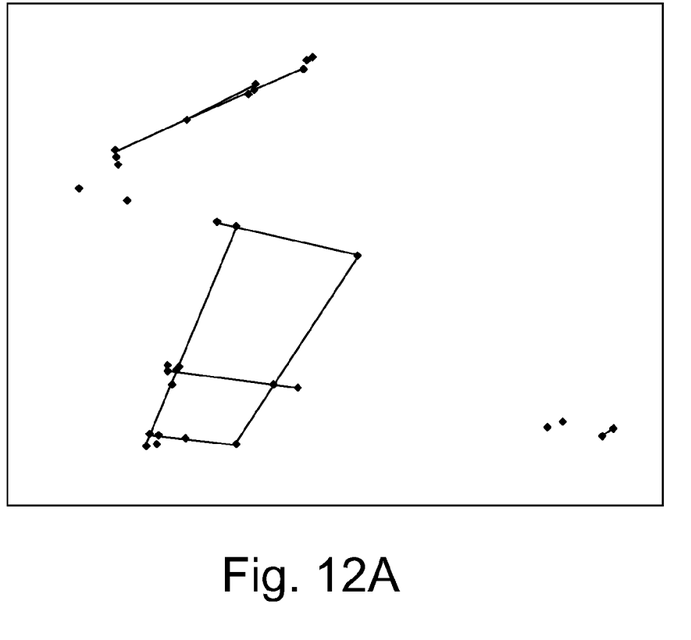
FIGS. 12A and 12B respectively illustrate an original graph showing edges and the graph showing the extracted cycles.
Figure 12B:
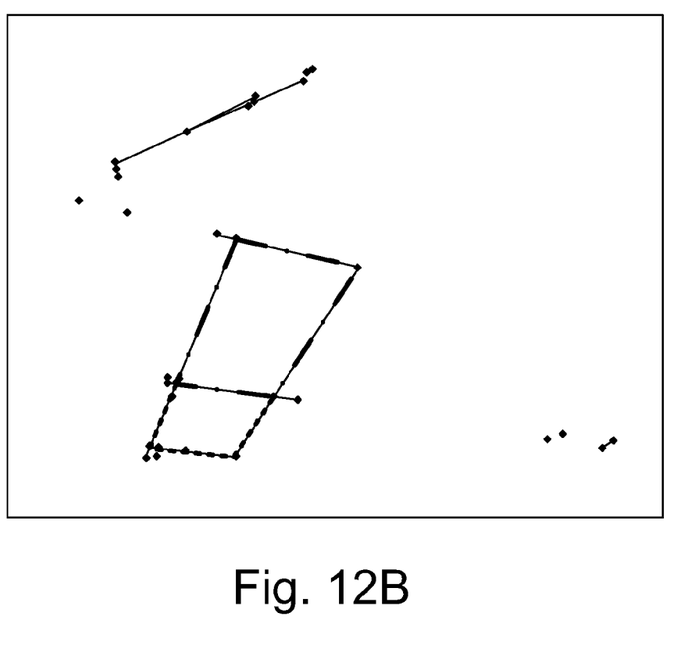

Additionally, the groups of lines may be combined together to detect cycles. Cycle detection includes repeatedly splitting a graph and each resulting subgraph into two, until each resulting subgraph contains one cycle. The resulting subgraphs containing one cycle are reported as interesting subgraphs. Cycle detection is illustrated in FIG. 11, which shows a graph that contains 4 cycles, which is split into two, thereby producing subgraphs containing 1 cycle and 3 cycles. The subgraph with 3 cycles is split again to produce additional subgraphs, which are further split until each subgraph has only 1 cycle. All of the subgraphs containing 1 cycle are then returned as a result. The two main components of this process are cycle detection and graph splitting which are illustrated below. FIGS. 12A and 12B, by way of example, respectively illustrate an original graph showing edges and the graph showing the extracted cycles, identified with a dotted line and a dot-dash line.

Cycle detection may be performed in various manners. To facilitate discussions, let $H_0$ represent the space of vertices. For example, referring to the subgraph illustrated in FIG. 10, $H_0$ is the powerset of the set of vertices $\{A,B,C,D\}$ such that $$A = \begin{bmatrix} 1 \\ 0 \\ 0 \\ 0 \end{bmatrix} \begin{matrix} A \\ B \\ C \\ D \end{matrix} \quad A \oplus B = \begin{bmatrix} 1 \\ 1 \\ 0 \\ 0 \end{bmatrix} \quad A \oplus A = \begin{bmatrix} 0 \\ 0 \\ 0 \\ 0 \end{bmatrix} \quad A * a = \begin{bmatrix} a \\ 0 \\ 0 \\ 0 \end{bmatrix} \qquad \text{eq. 4}$$

Figure 13:
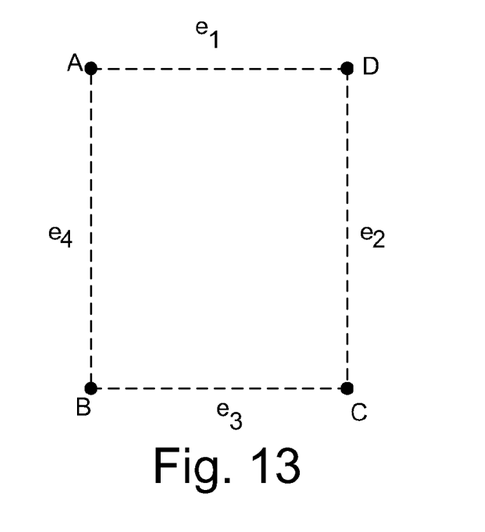
FIG. 13 illustrates lines between vertices A, B, C, and D similar to FIG. 10, but labels the edges $e_1$-$e_4$.

Further, let $H_1$ represent the powerset of the set of edges $\{e_1, e_2, e_3, e_4\}$ as shown in FIG. 13, which is similar to FIG. 10, but labels the edges $e_1$-$e_4$ such that:

$$e_1 = \begin{bmatrix} 1 \\ 0 \\ 0 \\ 0 \end{bmatrix} \begin{matrix} e_1 \\ e_2 \\ e_3 \\ e_4 \end{matrix} \quad e_1 \oplus e_2 = \begin{bmatrix} 1 \\ 1 \\ 0 \\ 0 \end{bmatrix} \quad e_1 \oplus e_1 = \begin{bmatrix} 0 \\ 0 \\ 0 \\ 0 \end{bmatrix} \quad e_1 * a = \begin{bmatrix} a \\ 0 \\ 0 \\ 0 \end{bmatrix}. \qquad \text{eq. 5}$$

Cycle detection may also be performed using the boundary operator $\partial$ defined as:

$$\partial: H_1 \to H_0$$

$$\partial(e_1) = A + D$$

$$\partial(e_1 + e_2) = \partial(e_1) + \partial(e_2) = A + D + D + C = A + C \qquad \text{eq. 6}$$

Thus, under the boundary operator, the cycle $c \in H_1$ can be defined as:

$$\text{cycle space} = \{c \in H_1 | \partial(c) = 0\} \qquad \text{eq. 7}$$

It should be noted that the space of cycles C is a vector space, and is the null space of $\partial$, and the number of cycles is equal to the number of eigenvalue of $\partial$ that are equal to zero.

By way of example, for the graph shown in FIG. 13, the boundary operator $\partial$ can be mathematically represented as: $\partial(e) = De$ where the matrix D is given by:

$$D = \begin{bmatrix} e_1 & e_2 & e_3 & e_4 \\ -1 & 0 & 0 & -1 \\ 0 & 0 & -1 & 1 \\ 0 & -1 & 1 & 0 \\ 1 & 1 & 0 & 0 \end{bmatrix} \begin{matrix} \hat{A} \\ \hat{B} \\ \hat{C} \\ \hat{D} \end{matrix} \qquad \text{eq. 8}$$

For example, $$\partial(e_1) = De_1 = \begin{bmatrix} -1 \\ 0 \\ 0 \\ 1 \end{bmatrix} = -\hat{A} + \hat{D}. \qquad \text{eq. 9}$$

Based on this description, the edges $e_1$, $e_2$, $e_3$, and $e_4$ form a cycle since under modulo 2 addition:

$$\partial(e_1 + e_2 + e_3 + e_4) = \begin{bmatrix} 0 \\ 0 \\ 0 \\ 0 \end{bmatrix} = \text{``0''}. \qquad \text{eq. 10}$$

Figure 14:
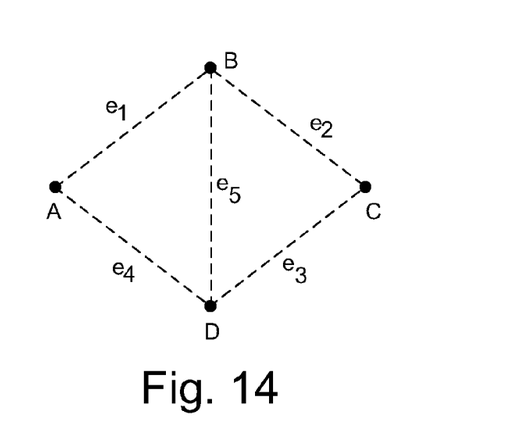
FIG. 14 illustrates five lines between four vertices as an example of cycle detection based on the matrix representation.

By way of example, FIG. 14 illustrates five lines between four vertices. The number of cycles can be found by looking at the number of eigenvalues of the Laplacian matrix that are equal to zero. In this example, the Laplacian Matrix $L=D^TD$ is given by:

$$D = \begin{matrix} e_1 & e_2 & e_3 & e_4 & e_5 \\ \begin{bmatrix} -1 & 0 & 0 & -1 & 0 \\ 1 & -1 & 0 & 0 & -1 \\ 0 & 1 & -1 & 0 & 0 \\ 0 & 0 & 1 & 1 & 1 \end{bmatrix} & \begin{matrix} \hat{A} \\ \hat{B} \\ \hat{C} \\ \hat{D} \end{matrix} \end{matrix} \quad \text{eq. 11}$$

$$L = D^TD = \begin{bmatrix} 2 & -1 & 0 & 1 & -1 \\ -1 & 2 & -1 & 0 & 1 \\ 0 & -1 & 2 & 1 & 1 \\ 1 & 0 & 1 & 0 & 1 \\ -1 & 1 & 1 & 1 & 2 \end{bmatrix}$$

$$eigenvalue = \begin{matrix} 0 \\ 0 \\ 2 \\ 4 \\ 4 \end{matrix}$$

Figure 15:
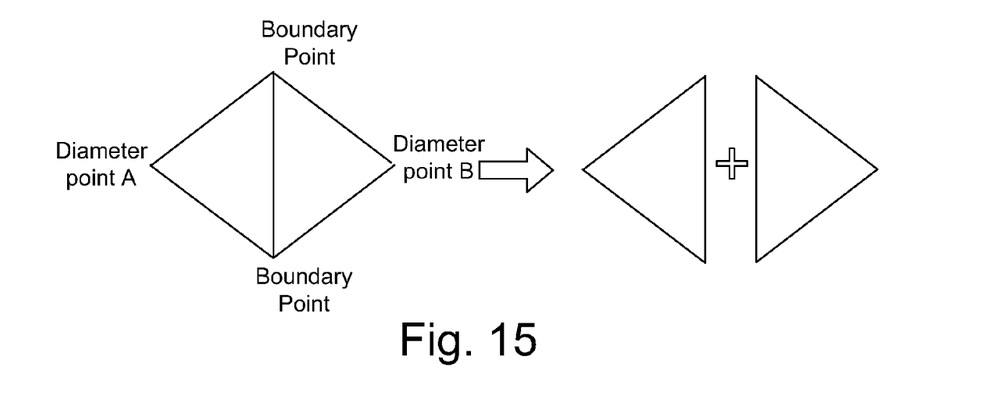
FIG. 15 illustrates splitting the graph illustrated in FIG. 14.

As illustrated in equation 11, there are two zero eigenvalues for the graph of the cycles shown in FIG. 14, and thus, there are two cycles. Thus, graph illustrated in FIG. 14 should be split, as illustrated in FIG. 15, where the split occurs at boundary points. A suitable implementation for graph splitting is described by Harish Chintakunta, Hamid Krim, Divide and Conquer in "Localizing Coverage holes in Sensor Networks", IEEE SECON, June, 2010, which is incorporated herein by reference. After graph splitting is performed, a closed path in each subgraph is found and considered to be the boundary of the interesting area. These resulting cycles may then be used in the tracking process.

Figure 16:
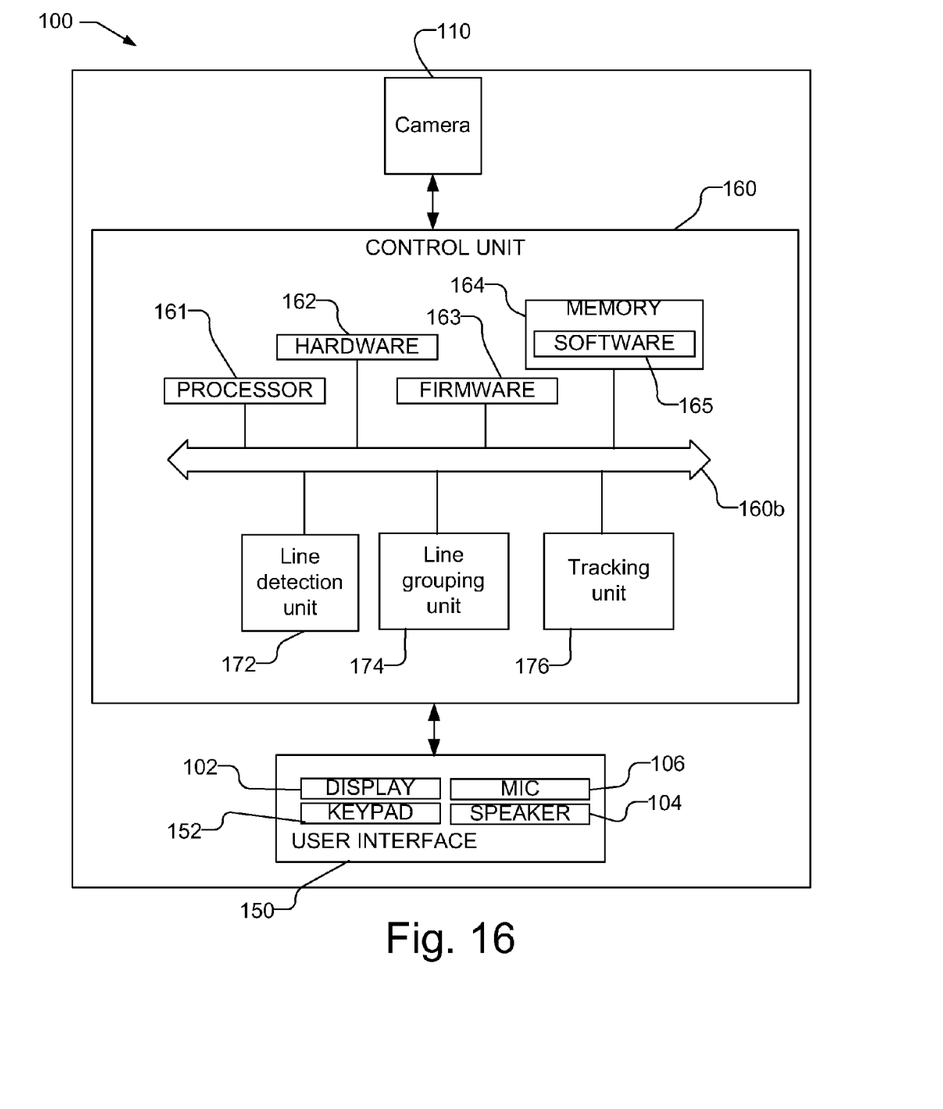
FIG. 16 is a block diagram of a mobile platform capable of tracking objects using a group of lines.

FIG. 16 is a block diagram of a mobile platform 100 capable of tracking objects using a group of lines. The mobile platform 100 includes the camera 110, as well as a user interface 150, which includes the display 102 capable of displaying images captured by the camera 110. The user interface 150 may also include a keypad 152 or other input device through which the user can input information into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone. The microphone 106 may be used to input audio annotations. Of course, mobile platform 100 may include other elements unrelated to the present disclosure.

The mobile platform 100 also includes a control unit 160 that is connected to and communicates with the camera 110, and user interface 150, as well as other systems that may be present. For example, motion and/or position sensors, such as accelerometers, gyroscopes, magnetometers, etc. may be present and used to provide additional information used in tracking. The control unit 160 accepts and processes data from the camera 110 as discussed above. The control unit 160 may be provided by a bus 160b, processor 161 and associated memory 164, hardware 162, software 165, and firmware 163. The mobile platform 100 includes the line detection unit 172, line grouping unit 174 and tracking unit 176, which make up the vision-based tracking unit 112 shown in FIG. 1, and that operate as described above. The line detection unit 172, line grouping unit 174 and tracking unit 176 are illustrated separately and separate from processor 161 for clarity, but may be a single unit and/or implemented in the processor 161 based on instructions in the software 165 which is run in the processor 161. It will be understood as used herein that the processor 161, as well as one or more of the line detection unit 172, line grouping unit 174 and tracking unit 176 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
capturing an image of an object to be tracked;
detecting a plurality of lines in the image of the object;
computing all intersection points of the plurality of lines;
using the intersection points to identify connected lines;
forming a group of lines from the connected lines in the plurality of lines; and
using the group of lines to track the object.

2. The method of claim 1, wherein the group of lines comprises connected lines.

3. The method of claim 2, wherein the connected lines form a closed figure.

4. The method of claim 1, wherein forming the group of lines from the plurality of lines comprises:
constructing a graph from the plurality of lines;
generating an interesting subgraph using connections between each pair of intersection points; and
forming the group of lines from the interesting subgraph.

5. The method of claim 4, further comprising detecting the object to be tracked by matching a reference model of the object to the interesting subgraph.

6. The method of claim 4, wherein using the group of lines to track the object comprises matching a reference model of the object to the interesting subgraph.

7. The method of claim 4, wherein generating the interesting subgraph comprises:
repeatedly splitting the graph and each resulting subgraph into two until each resulting subgraph contains one cycle; and
reporting resulting subgraphs that contain one cycle as interesting subgraphs.

8. The method of claim 1, wherein using the group of lines to track the object comprises using the group of lines to compare a current image of the object to a previous image of the object.

9. An apparatus comprising:
a camera;
a processor connected to the camera, the processor configured to detect a plurality of lines in an image captured by the camera of an object to be tracked, compute all intersection points of the plurality of lines, use the intersection points to identify connected lines, form a group of lines from the connected lines in the plurality of lines, and use the group of lines to track the object.

10. The apparatus of claim 9, wherein the group of lines comprises connected lines.

11. The apparatus of claim 10, wherein the connected lines form a closed figure.

12. The apparatus of claim 9, wherein the processor is configured to form the group of lines from the plurality of lines by being configured to construct a graph from the plurality of lines; generate an interesting subgraph using connections between each pair of intersection points; and form the group of lines from the interesting subgraph.

13. The apparatus of claim 12, wherein the processor is further configured to detect the object to be tracked by being configured to match a reference model of the object to the interesting subgraph.

14. The apparatus of claim 12, wherein the processor is configured to use the group of lines to track the object by being configured to match a reference model of the object to the interesting subgraph.

15. The apparatus of claim 12, wherein the processor is configured to generate the interesting subgraph by being configured to repeatedly split the graph and each resulting subgraph into two until each resulting subgraph contains one cycle; and report resulting subgraphs containing one cycle as interesting subgraphs.

16. The apparatus of claim 9, wherein the processor is configured to use the group of lines to track the object by being configured to compare a current image of the object captured by the camera to a previous image of the object captured by the camera.

17. An apparatus comprising:
means for capturing an image of an object to be tracked;
means for detecting a plurality of lines in the image of the object;
means for computing all intersection points of the plurality of lines;
means for using the intersection points to identify connected lines;
means for forming a group of lines from the connected lines in the plurality of lines; and
means for using the group of lines to track the object.

18. The apparatus of claim 17, wherein the group of lines comprises connected lines that form a closed figure.

19. The apparatus of claim 17, wherein the means for forming the group of lines from the plurality of lines comprises:
means for constructing a graph from the plurality of lines;
means for generating an interesting subgraph using connections between each pair of intersection points; and
means for forming the group of lines from the interesting subgraph.

20. The apparatus of claim 17, wherein the means for using the group of lines to track the object comprises means for using the group of lines to compare a current image of the object to a previous image of the object.

21. A non-transitory computer-readable medium including instructions stored thereon and that are executable by one or more processors, comprising:
instructions to detect a plurality of lines in an image of an object to be tracked that is captured with a camera;
instructions to compute all intersection points of the plurality of lines;
instructions to use the intersection points to identify connected lines;
instructions to form a group of lines from the connected lines in the plurality of lines; and
instructions to use the group of lines to track the object.

22. The non-transitory computer-readable medium of claim 21, wherein the group of lines comprises connected lines that form a closed figure.

23. The non-transitory computer-readable medium of claim 21, wherein forming the group of lines from the plurality of lines comprises:
instructions to construct a graph from the plurality of lines;
instructions to generate an interesting subgraph using connections between each pair of intersection points; and
instructions to form the group of lines from the interesting subgraph.

24. The non-transitory computer-readable medium of claim 21, wherein the instructions to use the group of lines to track the object comprises instructions to use the group of lines to compare a current image of the object to a previous image of the object.

* * * * *